United States Patent [19]

Grataloup

[11] 4,174,813
[45] Nov. 20, 1979

[54] PNEUMATIC SPREADER WITH PIVOTING SPREADER BARS

[75] Inventor: Xavier R. Grataloup, Montereau, France

[73] Assignee: Société Anonyme dite: Nodet-Gougis, Montereau, France

[21] Appl. No.: 881,364

[22] Filed: Feb. 27, 1978

[30] Foreign Application Priority Data

Mar. 4, 1977 [FR] France .......................... 77 06437

[51] Int. Cl.² .............................................. A01C 3/06
[52] U.S. Cl. .................................... 239/655; 239/664
[58] Field of Search ............... 239/655, 664, 167, 168, 239/166, 169, 651

[56] References Cited

U.S. PATENT DOCUMENTS

| Re. 24,256 | 12/1956 | Smith | 239/655 |
|---|---|---|---|
| 2,691,236 | 10/1954 | Tuft | 239/655 |
| 2,976,643 | 3/1961 | Chafer | 239/655 |

FOREIGN PATENT DOCUMENTS

516389  1/1953  Belgium .................................. 239/664

*Primary Examiner*—John J. Love
*Attorney, Agent, or Firm*—Diller, Ramik & Wight

[57] ABSTRACT

A high capacity pneumatic spreader including a frame carried by wheels and a hopper carried by the frame with the hopper having an elevational profile defined in part by a pair of opposite lateral sides and at least one spreader bar carried by the frame, the spreader bar being movable between a first generally horizontal position projecting laterally from the frame beyond one of the sides and a second generally vertical position between the lateral sides, an end of the spreader bar adjacent the hopper being connected by a horizontal pivot to an arm which is in turn connected by a vertical pivot to the frame, and the vertical pivot being disposed between the hopper sides whereby the spreader bar can be disposed generally vertically and within the profile of the hopper between the sides thereof.

5 Claims, 4 Drawing Figures

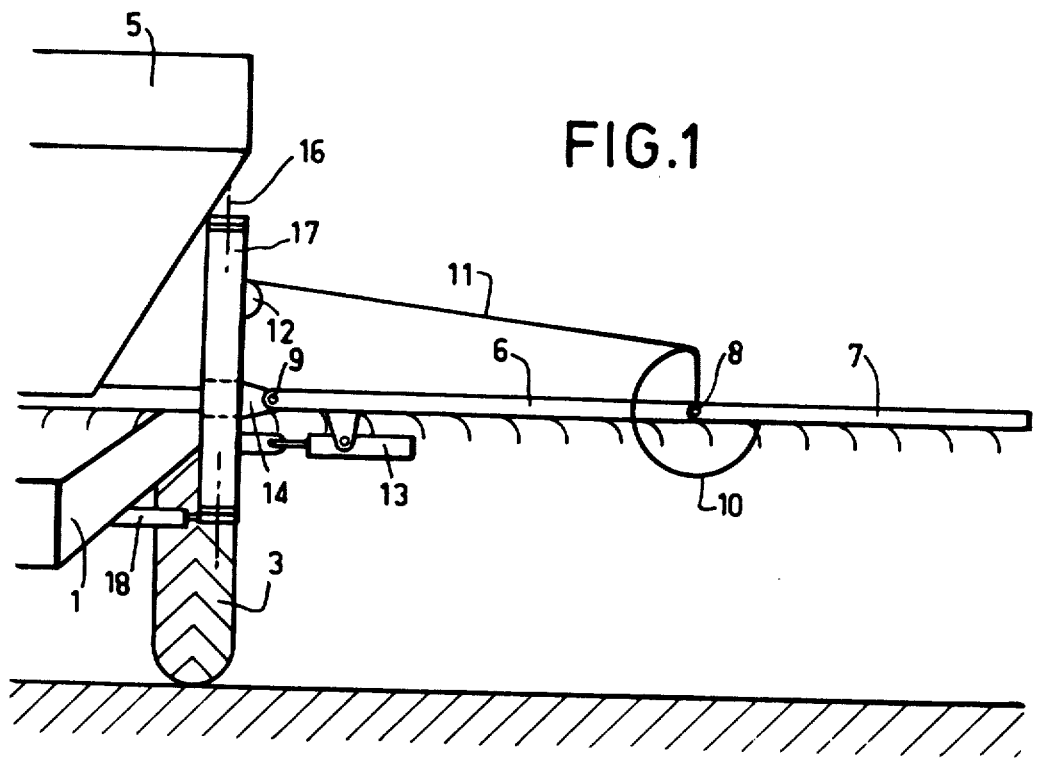
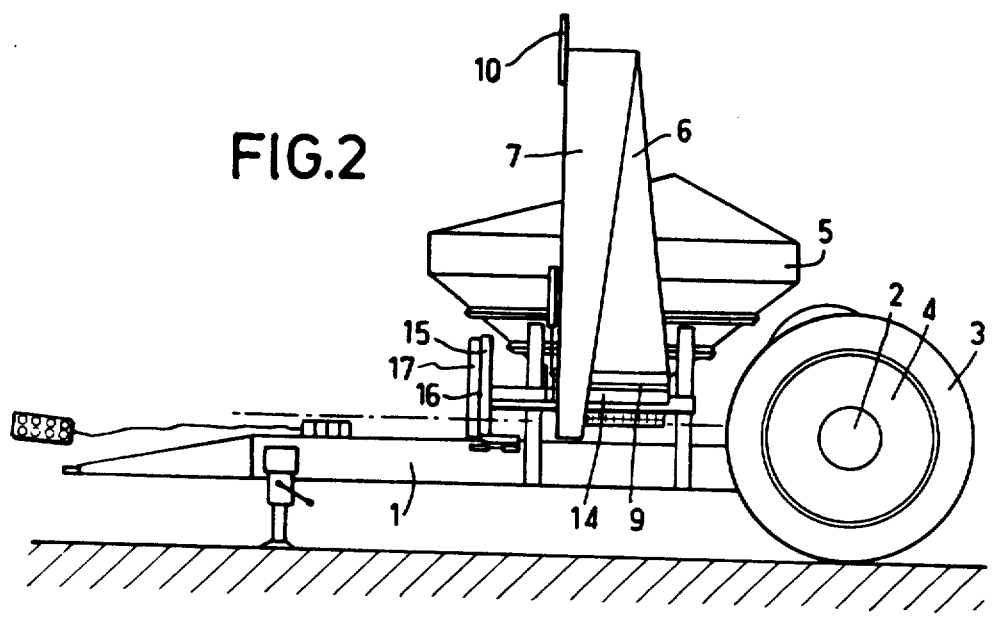

PNEUMATIC SPREADER WITH PIVOTING SPREADER BARS

BACKGROUND OF THE INVENTION

1. Field of the Invention

The present invention relates to a high capacity pneumatic spreader notably for powdered or granular materials.

The invention is applicable more particularly to spreaders whose spreader bars are borne by the main frame or chassis supporting the hopper designed for storing the material to be spread.

2. Description of the Prior Art

Conventional pneumatic spreaders which generally comprise a main frame mounted at one end on two rear wheels, a hopper resting on said frame and foldable spreader bars capable of being deployed laterally to spread the material, can be classified in two separate types according as the spreader bars are borne by a second frame coupled behind the frame supporting the hopper or as they are borne and folded directly to this hopper-supporting frame on each side of the latter.

British Pat. No. 1,435,999 and U.S. Pat. No. 2,657,949 fully illustrate the state of the art in the field of spreaders of the first type mentioned above whilst French Pat. No. 1,584,381 corresponding to British Pat. No. 1,271,738, to German Pat. No. 1,939,413 and to U.S. Pat. No. 3,568,937 is a good example of the field of spreaders of the second type mentioned above.

In spreaders of the first type, the surroundings of the hopper are clear on each side which facilitates considerably the loading of the latter with the substance to be spread, but the longitudinal bulk is large, notably during transportation when the ramps are folded back rearwards and add their length to that of the frame hopper-supporting frame and to that of the tractor.

In spreaders of the second type such as that forming the subject of French Pat. No. 1,584,381, the length of a second frame is economized by arranging for the spreader bars to be carried by the hopper-supporting frame and the approaches are kept free on the sides of said hopper but nonetheless the overall length of the whole still remains too great due to the fact that the spreader bars are folded back rearwards in extension of the frame. Attempt has already been made to overcome this drawback by raising the spreader bars upwards on each side of the hopper instead of folding them back rearwards, but with this solution, the spreader bars border the hopper laterally and for this reason interfere with loading from the side, this arrangement of the spreader bars on each side of the hopper resulting also in numerous other drawbacks such as, in particular, the risk of said spreader bars becoming damaged by the loading equipment loading from the sides so that it becomes necessary to load from the rear, which necessitates a reduction in the diameter of the transporting wheels so as to be able to approach the hopper, as a result of which there are high contact pressures with the soil which necessitate considerable pulling forces to move the spreader.

In addition, to remain within the highway gauge the thickness of the spreader arms only allows a reduced hopper width and, to keep a sufficient transportation capacity, it is necessary to increase the height of said hopper with the risk of reducing the stability of the whole.

Accordingly, it is an object of the invention to provide a spreader which does not have the aforementioned drawbacks.

It is another object to provide a spreader which permits side loading without however resulting in an increase in length or a reduction in the stability of the equipment.

GENERAL DESCRIPTION OF THE INVENTION

The high capacity pneumatic spreader according to the invention, notably for spreading powdered or granular substances, comprises a frame mounted on wheels, a hopper resting on the latter and spreader bars borne by this frame, said spreader bars being capable, in operation, of being deployed laterally on each side of the hopper and, during transportation, folded back within the clearance of the hopper, the spreader bars being each articulated at their base around a substantially horizontal arm itself articulated around at least one substantially vertical pivot, the spreader comprising in addition means for lifting the spreader bars around the arm and for bringing back the latter within the profile of the hopper, namely, within the longitudinal prolongation or between opposite sides of the hopper.

The side loading of the hopper can hence be done without risk of accident to the spreader bars. Loading from the rear is no longer necessary and permits the use of wheels of large diameter. The width-wise bulk of the equipment is thus reduced, enabling the adoption for the hopper of the maximum width authorized by the highway code and the overall length to remain within very reasonable limits facilitating transportation on the highway.

BRIEF DESCRIPTION OF THE DRAWINGS

The invention will now be described in more detail with reference to a particular embodiment given by way of nonlimiting example and shown by the accompanying drawings, in which:

FIG. 1 shows an embodiment of a spreader according to the invention viewed from the front with one lateral spreader bar deployed;

FIG. 2 shows a side view of the embodiment of FIG. 1 with its spreader bars lifted up;

DESCRIPTION OF A SPECIFIC EMBODIMENT

Figure 3:
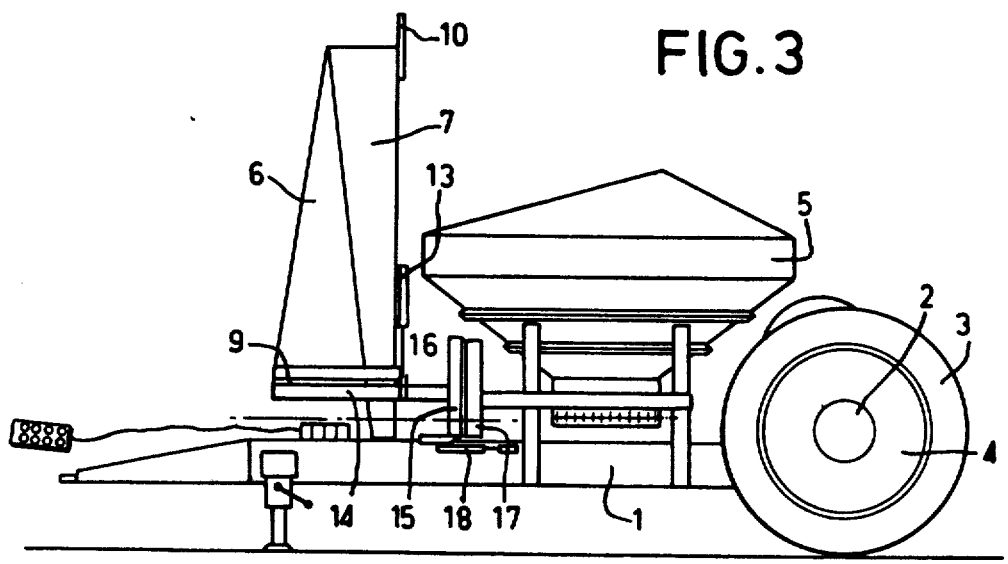
FIG. 3 shows a side view of the embodiment of FIG. 2 with the lifted spreader bars folded back within prolongation of the hopper.

As shown in the figures, this embodiment of the spreader comprises a frame 1 borne by a rear axle 2 mounted on two wheels 3 of large diameter provided with a rim 4 enabling adjustment of the width of the track to that of the tractor to which the apparatus is hitched.

A hopper of large capacity 5 is supported by the frame 1, said hopper being designed to receive the powdered or granular material or the like to be spread.

Beneath the hopper 5 are arranged dispensing elements of known type, not shown, which distribute the material into pipe necks forming part of a conventional pneumatic propelling system comprising two clusters of coupled transporting pipes constituting two lateral spreader bars.

As can be seen in FIG. 1, each spreader bar is formed of two parts 6 and 7 articulated together around a substantially horizontal axis 8, the part 6 being itself articulated at its other end around a substantially horizontal axis 9 so that the spreader bar can first be folded back and then raised to the side of the hopper 5. The folding of the part 7 with respect to the part 6 of the spreader bar is produced by means of a sector 10 fast to the part 7 to which is connected a traction cable 11 wound over a pulley 12 and a double-acting jack 13 is provided at the base of each spreader bar for the raising or lowering of the latter. The part of each spreader bar adjacent to the frame, that is to say the part 6, is hinged around its axis 9, on a substantially horizontal pivoting arm 14 fastened at right angles at one end to a post 15 conventionally articulated around a substantially vertical axis 16 to a post 17 fixed to the frame in front of the hopper; preferably, the vertical posts 17 fast to the frame are arranged to be situated within the lateral bulk of the hopper so that the clearance of the spreader is limited by the width of the latter.

Each pivoting arm 14 is manipulated by a double-acting jack 18 connected on the one hand to said arm and on the other hand to the frame 1. The lifting 13 and folding 18 jacks are hydraulic jacks supplied by an electrodistributor unit controlled by an electrical box placed in the tractor cabin.

Figure 4:
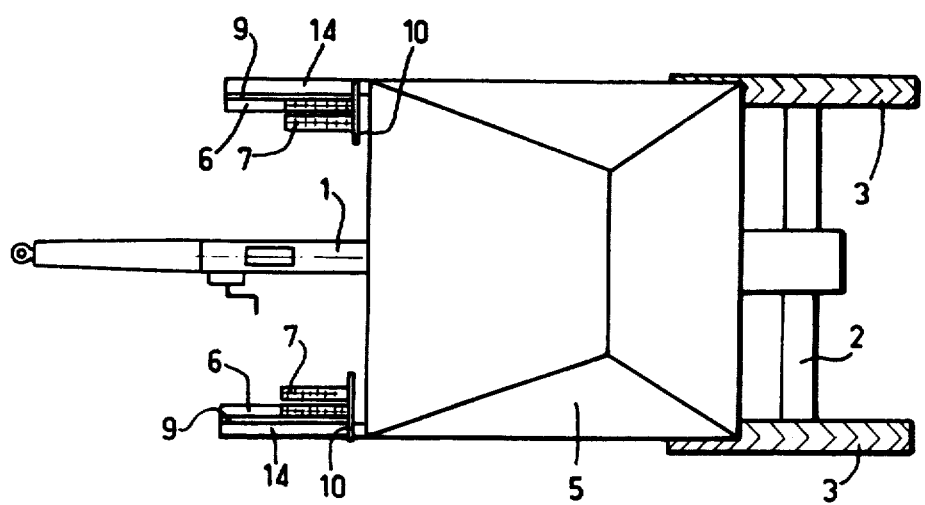
FIG. 4 shows a view from above of the embodiment in its state shown in FIG. 3.

The spreader according to the invention is placed in transportation position in the following manner. From the working position, in which the spreader bars are deployed laterally on each side of the hopper (FIG. 1), the outer parts 7 of each spreader bar are folded back along the inner parts 6 by loosening the cable 11 whilst the parts 6 are lifted by the jacks 13 on both sides of the hopper. When the two spreader bars are folded back and lifted laterally above the horizontal arms 14 (FIG. 2), the double-acting jacks 18 push said arms and the associated spreader bars so as to cause them to pivot around the vertical axes 16 and bring them back toward the front of the hopper in the longitudinal prolongation of the latter as shown in FIGS. 3 and 4. The arms 14 and the spreader bars are then arranged in line with the sides of the hopper and are incorporated within the profile of the latter or between the sides thereof, as is best illustrated in FIG. 4.

In this manner, not only the sides of the hopper are clear, thus permitting side loading and the use of large diameter wheels at the back, but also the hopper can fill in width the whole of the authorized highway width or gauge which enables reduction of its height and consequently increase in the stability of the equipment. Of course, the scope of the invention is not limited to the single embodiment described by way of non-limiting example, but it covers also any modifications which differ only in details.

Thus instead of pivoting the spreader bars towards the front of the hopper, it is, of course, possible to pivot them toward the rear to the extent that the wheels are mounted so as not to interfere with the movement, in which case the posts 17 are fixed to the frame supporting the hopper behind the latter and with the associated pivoting axes 16 still situated within the lateral bulk of said hopper.

In the same way, the withdrawal of the spreader bars within the gange defined by the hopper can be carried out other than by pivoting around a vertical axis, for example by double longitudinal and transverse translation which can be obtained notably by the deformation of an articulated parallelogram fixed to the frame and of which one side replaces the pivoting arm 14.

Finally, the various manipulations of the spreader bars can be done manually with or without the assistance of a mechanical system.

I claim:

1. A high capacity pneumatic spreader particularly adapted for spreading powdered or granular substances comprising a frame mounted on wheels, a hopper carried by said frame, said hopper having an elevational profile defined in part by a pair of opposite lateral sides, at least one spreader bar carried by said frame, said spreader bar being movable between a first generally horizontal position projecting laterally from said frame beyond one of said sides and a second generally vertical position between said lateral sides, said spreader bar having first and second ends respectively adjacent to and remote from said frame in said first position, an arm positioned between said spreader bar first end and said frame, first pivot means for pivotally connecting said arm to said spreader bar first end for relative pivoting movement about a generally horizontal axis, means for raising said spreader bar to a generally vertical position by pivoting movement of said spreader bar about said first pivot means, second pivot means for pivotally connecting said arm to said frame for relative pivoting movement about a generally vertical axis, and said second pivot means being disposed between said hopper sides whereby said spreader arm can be pivoted about said second pivot means from a generally vertical position laterally outboard of one of said hopper sides to a generally vertical position within said profile and between said hopper sides.

2. The spreader as defined in claim 1 wherein said hopper further includes a front and rear, and said second pivot means is disposed adjacent one of said hopper front and rear.

3. The spreader as defined in claim 1 wherein said hopper further includes a front and rear, and said second pivot means is disposed adjacent said hopper front.

4. The spreader as defined in claim 1 including means connected between said spreader bar and said frame for effecting movement of said arm about said second pivot means relative to said frame.

5. The spreader as defined in claim 4 wherein said movement effecting means includes a hydraulic cylinder and rod connected between said arm and said frame.

* * * * *